United States Patent
Wu

(10) Patent No.: US 11,363,620 B2
(45) Date of Patent: Jun. 14, 2022

(54) RESOURCE REQUEST METHOD AND USER EQUIPMENT

(71) Applicant: VIVO MOBILE COMMUNICATION CO., LTD., Chang'an Dongguan (CN)

(72) Inventor: Yumin Wu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 17/121,158

(22) Filed: Dec. 14, 2020

(65) Prior Publication Data

US 2021/0100018 A1 Apr. 1, 2021

Related U.S. Application Data

(63) Continuation of application No. PCT/CN2019/088878, filed on May 28, 2019.

(30) Foreign Application Priority Data

Jun. 21, 2018 (CN) .......................... 201810646678.5

(51) Int. Cl.
*H04W 72/12* (2009.01)
*H04W 80/02* (2009.01)
(Continued)

(52) U.S. Cl.
CPC ... *H04W 72/1273* (2013.01); *H04W 72/1257* (2013.01); *H04W 80/02* (2013.01)

(58) Field of Classification Search
CPC ......... H04W 72/1273; H04W 72/1257; H04W 80/02; H04W 74/0808; H04W 72/1284; H04L 5/0053
See application file for complete search history.

(56) References Cited

U.S. PATENT DOCUMENTS

2013/0235768 A1 9/2013 Earnshaw et al.
2015/0289289 A1 10/2015 Qian et al.
(Continued)

FOREIGN PATENT DOCUMENTS

CN 101795497 A 8/2010
CN 104969526 A 10/2015
(Continued)

OTHER PUBLICATIONS

International Search Report & Written Opinion related to Application No. PCT/CN2019/088878; dated Aug. 28, 2019.
(Continued)

*Primary Examiner* — Harry H Kim
(74) *Attorney, Agent, or Firm* — von Briesen & Roper, s.c.

(57) ABSTRACT

Embodiments of the present invention provide a resource request method and user equipment. The method includes: obtaining first information when UE triggers a scheduling request SR; and executing, by the UE based on the first information, any one of the following actions: at least one of skipping increasing counting of a first counter and increasing counting of a second counter, and at least one of stopping a timer and prohibiting starting a timer, where the first information is used to indicate that the UE has currently stopped transmitting the SR, the UE is unable to transmit the SR on an SR resource within a duration corresponding to the timer, the first counter is used to record a count of transmitting the SR, and the second counter is used to record a count of stopping transmitting the SR.

15 Claims, 2 Drawing Sheets

UE obtains first information when the UE triggers an SR — 201

The UE executes any one of the following actions based on the first information: at least one of skipping increasing counting of a first counter and increasing counting of a second counter, and at least one of stopping a timer and prohibiting starting a timer — 202

(51) Int. Cl.
*H04W 74/08* (2009.01)
*H04L 5/00* (2006.01)

(56) References Cited

U.S. PATENT DOCUMENTS

| | | | |
|---|---|---|---|
| 2017/0064732 A1 | 3/2017 | Wu | |
| 2017/0142708 A1 | 5/2017 | Ho et al. | |
| 2017/0142749 A1 | 5/2017 | Kim et al. | |
| 2018/0124831 A1 | 5/2018 | Dinan | |
| 2018/0139030 A1* | 5/2018 | Kim | H04L 5/0042 |
| 2018/0167966 A1 | 6/2018 | Dinan | |
| 2018/0324635 A1* | 11/2018 | Babaei | H04W 74/006 |
| 2018/0368167 A1* | 12/2018 | Kim | H04W 74/0833 |
| 2019/0394082 A1* | 12/2019 | Cirik | H04L 5/0048 |
| 2020/0120704 A1* | 4/2020 | Wang | H04L 5/0091 |
| 2021/0100010 A1* | 4/2021 | Yoon | H04W 72/1284 |

FOREIGN PATENT DOCUMENTS

| | | |
|---|---|---|
| CN | 105453670 A | 3/2016 |
| CN | 104170508 B | 7/2016 |
| CN | 106488576 A | 3/2017 |
| EP | 3749041 A1 | 9/2020 |
| WO | 2017043074 A1 | 3/2017 |

OTHER PUBLICATIONS

Chinese Search Report for related Application No. 201810646678.5; dated Apr. 2, 2020.
Ericsson, "SR Prohibit Timer for Rel-13 eMTC UEs", May 23-27, 2016, 3GPP TSG RAN WG2 #94, Nanjing, P.R. China.
Nokia, Nokia Shanghai Bell, "MAC impacts due to NR-based access to unlicensed spectrum", May 21-25, 2018, 3GPP TSG-RAN WG2 Meeting #102, Busan, South Korea.
Vivo, "Collision of SR and PRACH", May 21-25, 2018, 3GPP TSG-RAN WG2 Meeting #102, Busan, South Korea.
European Search Report related to PCT/CN2019/088879 dated Jul. 12, 2021.
Japanese Notice of Reasons for Refusal for related Application No. 2020-570758; dated Mar. 16, 2022.
Vivo, "Discussion on SR procedure", Aug. 20-24, 2018, 3GPP TSG-RAN WG2 Meeting #103, Gothenburg, Sweden, R2-1811790.

* cited by examiner

RESOURCE REQUEST METHOD AND USER EQUIPMENT

CROSS-REFERENCE TO RELATED APPLICATIONS

The present invention is a continuation application of International Application No. PCT/CN2019/088878 filed on May 28, 2019, which claims priority to Chinese Patent Application No. 201810646678.5, filed with the China National Intellectual Property Administration on Jun. 21, 2018 and entitled "RESOURCE REQUEST METHOD AND USER EQUIPMENT", both disclosures of which are incorporated herein by reference in their entireties.

TECHNICAL FIELD

The present invention relates to the field of communications technologies, and in particular, to a resource request method and user equipment.

BACKGROUND

Currently, for an unlicensed frequency band, a transmit end device needs to monitor whether the unlicensed frequency band is occupied before transmitting a signal. The transmit end device sends the signal only when the unlicensed frequency band is not occupied. Generally, the preceding monitoring process is called listen-before-talk (LBT).

In the related art, if user equipment (UE) triggers a buffer status report (BSR) and if no uplink resource is available for this BSR, the UE will trigger a scheduling request (SR) transmission (for example, a medium access control (MAC) layer of the UE instructs a physical (PHY) layer to transmit the SR).

However, after triggering the SR transmission, the UE will perform an LBT procedure to monitor whether a frequency used for transmitting the SR is occupied. If the frequency is occupied, the SR transmission may fail, which then increases a failure probability of an SR procedure.

SUMMARY

According to a first aspect, an embodiment of the present invention provides a resource request method. The method includes:

obtaining first information when user equipment UE triggers a scheduling request SR; and executing, by the UE based on the first information, any one of the following actions: at least one of skipping increasing counting of a first counter and increasing counting of a second counter, and at least one of stopping a timer and prohibiting starting a timer, where the first information is used to indicate that the UE has currently stopped transmitting the SR, the UE is unable to transmit the SR on an SR resource within a duration corresponding to the timer, the first counter is used to record a count of transmitting the SR, and the second counter is used to record a count of stopping transmitting the SR.

According to a second aspect, an embodiment of the present invention provides user equipment, including:

an obtaining module, configured to obtain first information when the UE triggers a scheduling request SR; and an execution module, configured to execute any one of the following actions based on the first information obtained by the obtaining module: at least one of skipping increasing counting of a first counter and increasing counting of a second counter, and at least one of stopping a timer and prohibiting starting a timer, where the first information is used to indicate that the UE has currently stopped transmitting the SR, the UE is unable to transmit the SR on an SR resource within a duration corresponding to the timer, the first counter is used to record a count of transmitting the SR, and the second counter is used to record a count of stopping transmitting the SR.

According to a third aspect, an embodiment of the present invention provides user equipment, including a processor, a memory, and a computer program stored in the memory and capable of running on the processor, where when the computer program is executed by the processor, the steps of the resource request method according to the second aspect are implemented.

According to a fourth aspect, an embodiment of the present invention provides a computer-readable storage medium, where the computer-readable storage medium stores a computer program, and when the computer program is executed by a processor, the steps of the foregoing resource request method are implemented.

DESCRIPTION OF EMBODIMENTS

The following clearly describes the technical solutions in the embodiments of the present invention with reference to the accompanying drawings in the embodiments of the present invention. Apparently, the described embodiments are some rather than all of the embodiments of the present invention. Based on the embodiments of the present invention, all other embodiments derived by persons of ordinary skill in the art without creative efforts fall within the protection scope of the present invention.

Technical solutions provided in the present invention may be applied to various communications systems, such as a 5G communications systems, a future evolved system, or a system that integrates a plurality of communications technologies. A plurality of application scenarios may be included, for example, machine to machine (M2M), D2M, macro-micro, enhanced mobile broadband (eMBB), ultra reliable and low latency communications (uRLLC), and massive machine-type communications (mMTC) scenarios. These scenarios include but are not limited to communication between UEs, communication between network devices, and communication between a network device and UE. Embodiments of the present invention may be applied to communication between a network device and UE, communication between UEs, or communication between network devices in a 5G communications system.

Figure 1:
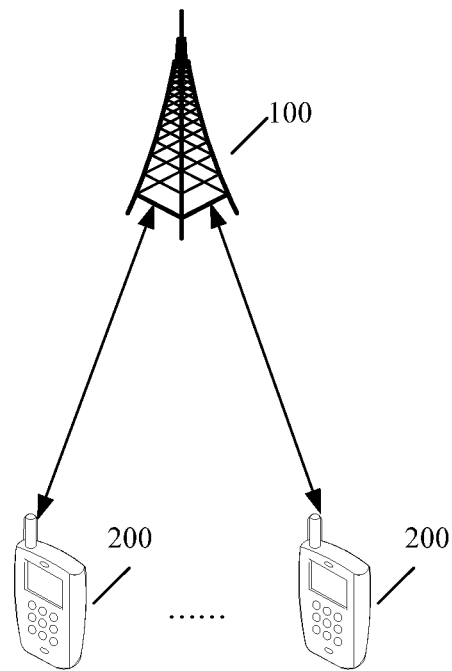
FIG. 1 is a schematic structural diagram of a communications system in an embodiment of the present invention.

FIG. 1 is a possible schematic structural diagram of a communications system in an embodiment of the present invention. As shown in FIG. 1, the communications system includes at least one network device 100 (only one in FIG. 1) and one or more UEs 200 connected to each network device 100.

The network device 100 may be a base station, a core network device, a transmission and reception point (TRP), a relay station, an access point, or the like. The network device 100 may be a base transceiver station (BTS) in a global system for mobile communications (GSM) or a code division multiple access (CDMA) network, an NB (NodeB) in wideband code division multiple access (WCDMA), or an eNB or eNodeB (evolved NodeB) in LTE. Alternatively, the network device 100 may be a wireless controller in a cloud radio access network (CRAN) scenario. Alternatively, the network device 100 may be a network device in a 5G communications system or a network device in a future evolved network. However, the terms are not intended to limit the present invention.

The UE 200 may be a terminal. The terminal may be a wireless terminal, or may be a wired terminal. The wireless terminal may be a device that provides voice and/or other service data connectivity for a user, a handheld device or a computing device that has a wireless communication function, or another processing device connected to a wireless modem, an in-vehicle device, a wearable device, a terminal in a future 5G network, a terminal in a future evolved PLMN network, or the like. The wireless terminal may communicate with one or more core networks by using a radio access network (RAN). The wireless terminal may be a mobile terminal, such as a mobile phone (also referred to as a "cellular" phone) and a computer that is provided with a mobile terminal, for example, may be a portable mobile apparatus, a pocket-sized mobile apparatus, a handheld mobile apparatus, a computer built-in mobile apparatus, or an in-vehicle mobile apparatus that exchanges voice and/or data with the radio access network, and a device such as a personal communications service (PCS) phone, a cordless telephone set, a session initiation protocol (SIP) phone, a wireless local loop (WLL) station, or a personal digital assistant (PDA). The wireless terminal may also be a mobile device, a UE terminal, an access terminal, a wireless communications device, a mobile station, a mobile, a remote station, a remote terminal, a subscriber unit, a subscriber station, a user agent, or a terminal apparatus. As an example, in this embodiment of the present invention, the UE is shown as a mobile phone in FIG. 1.

Figure 2:
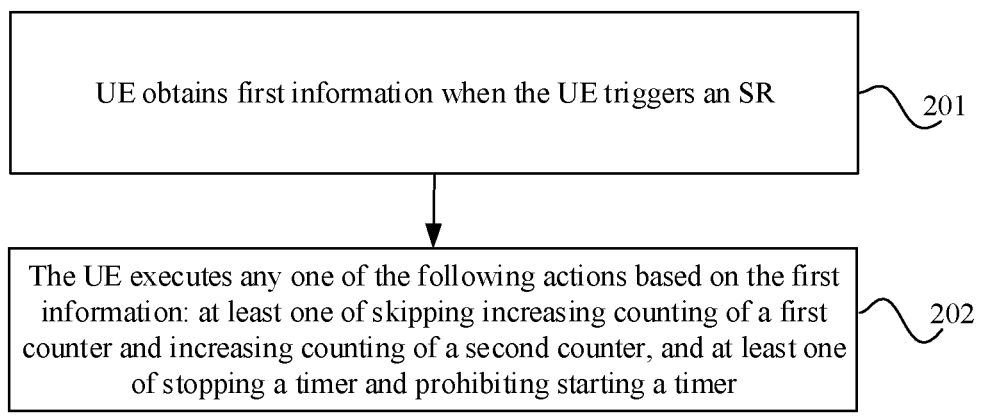
FIG. 2 is a schematic flowchart of a resource request method according to an embodiment of the present invention.

FIG. 2 is a schematic flowchart of a resource request method according to an embodiment of the present invention. As shown in FIG. 2, the resource request method may include the following steps.

Step 201: UE obtains first information when the UE triggers an SR.

In this embodiment of the present invention, the first information is used to indicate that the UE has currently stopped transmitting the SR. That is, it may be considered that the first information is used to indicate that the SR transmission is discarded. For example, because an SR transmission frequency is occupied, the upcoming SR transmission is discarded.

Optionally, in this embodiment of the present invention, the first information is indication information sent by a PHY layer of the UE to a MAC layer. For example, if the UE triggers a BSR and if no uplink resource is available for this BSR, the UE will trigger an SR transmission. In this case, the PHY layer of the UE indicates an "indication that SR transmission is discarded" to the MAC layer.

Step 202: The UE executes any one of the following actions based on the first information: at least one of skipping increasing counting of a first counter and increasing counting of a second counter, and at least one of stopping a timer and prohibiting starting a timer.

In this embodiment of the present invention, the UE is unable to transmit the SR on an SR resource within a duration corresponding to the timer. That is, the UE is unable to transmit the SR on the SR resource before the timer expires. It should be noted that the timer in this embodiment of the present invention is an existing "SR prohibit timer (sr-ProhibitTimer)".

The SR resource used for transmitting the SR may be configured on one or more cells.

In this embodiment of the present invention, the first counter is used to record a count of transmitting the SR. It should be noted that the first counter in this embodiment of the present invention is an existing "SR transmission counter (SR_COUNTER)".

In this embodiment of the present invention, the second counter is used to record a count of stopping transmitting the SR.

For example, in this embodiment of the present invention, when the UE has currently stopped transmitting the SR, the UE executes different actions to solve different technical problems.

In a first possible example:

In the related art, after the UE triggers the SR, the UE will immediately start the timer, and the UE is unable to transmit the SR on the SR resource before the timer expires. An LBT procedure is usually executed after the timer expires. In this case, if the UE performs LBT and finds that the SR transmission frequency is occupied, the UE still is unable to transmit the SR after the timer expires. As a result, the SR is unable to be sent immediately on an available SR resource, and an additional SR transmission delay is caused.

Regarding this problem, when the UE has currently stopped transmitting the SR, the UE in this embodiment of the present invention executes the following actions on the timer: at least one of stopping the timer and prohibiting starting a timer, so that the UE is able to immediately transmit the SR on a subsequent SR resource. As a result, the SR delay is reduced and the failure probability of the SR procedure is decreased.

For example, the action of stopping the timer means: stopping, by the UE, the timer when the timer has been started.

For example, the action of prohibiting starting a timer means: prohibiting, by the UE, starting a timer when the timer has not been started.

In a second possible example:

In the related art, after the UE triggers the SR, the UE will perform an LBT procedure, to monitor whether a frequency used for transmitting the SR is occupied. If the frequency is occupied, the SR transmission may fail. The SR transmission failure increases the counting of the first counter by 1. Usually, when the counting of the first counter reaches a threshold, the UE considers the SR procedure fails. Therefore, the SR transmission failure caused by LBT will also cause the first counter to continue counting, thereby increasing the failure probability of the SR procedure.

Regarding this problem, when the UE has currently stopped transmitting the SR, the UE in this embodiment of the present invention executes at least one of the following actions: skips increasing the counting of the first counter and increasing the counting of the second counter to decrease the failure probability of the SR procedure.

For example, when the counting of the first counter is greater than a second threshold, the UE considers the SR procedure fails, and initiates a random access process.

For example, the second threshold may be predefined (for example, provided in a protocol) or configured for the UE by a network device.

For example, the UE in this embodiment of the present invention adds the second counter that is used to record a count of stopping transmitting the SR to distinguish between the count of stopping transmitting the SR and a count of successfully transmitting the SR. In this way, when the UE has currently stopped transmitting the SR, the UE can choose to skip increasing the counting of the first counter and only increase the counting of the second counter to prevent the first counter from continuing counting.

For example, the process of increasing the counting of the second counter by the UE may be: increasing, by the UE, the counting of the second counter by 1. It should be noted that the increasing the counting by 1 is merely an example. In actual application, an increased number is not limited.

In the resource request method provided in this embodiment of the present invention, when the UE triggers the SR, the UE executes any one of the following actions based on the first information that is used to indicate that the UE has currently stopped transmitting the SR: at least one of skipping increasing the counting of the first counter and increasing the counting of the second counter, and at least one of stopping the timer and prohibiting starting a timer. In this way, when the UE has currently stopped transmitting the SR, the UE properly controls the counter to decrease the failure probability of the SR procedure. At the same time, the timer is suspended or prohibited from starting up, so that the UE is able to immediately transmit the SR on a subsequent SR resource. As a result, the SR delay is reduced and the failure probability of the SR procedure is decreased.

Optionally, the method provided in this embodiment of the present invention further includes the following steps.

Step A1: The UE sends the SR to a network device.

Step A2: The UE resets the second counter.

For example, after the UE sends the SR, the UE needs to reset the counting of the second counter, that is, to reset the counting of the second counter to an initial value. For example, the UE sets the counting of the second counter to the initial value "0".

It should be noted that a specific opportunity of executing Step A1 and Step A2 is not limited in the present invention. They may be executed before Step 201, or may be executed after Step 201. Certainly, they may be executed after Step 202.

In this embodiment of the present invention, after the UE sends the SR to the network device, it indicates that the UE currently sends the SR successfully and can reset the second counter to record a count of the UE prohibiting transmitting the SR when the UE prohibits transmitting the SR next time, thereby improving counting accuracy of the second counter.

Optionally, the method provided in this embodiment of the present invention further includes the following steps.

Step B1: If the counting of the second counter is greater than or equal to a first threshold, the UE increases the counting of the first counter by 1 or considers the SR procedure fails.

For example, the first threshold may be predefined (for example, provided in a protocol) or configured for the UE by a network device.

For example, the process of increasing the counting of the first counter by the UE may be: increasing, by the UE, the counting of the first counter by 1. It should be noted that the increasing the counting by 1 is merely an example. In actual application, an increased number is not limited.

In this embodiment of the present invention, after the counting of the second counter is greater than or equal to the first threshold, that is, when the count of the UE prohibiting transmitting the SR reaches a threshold, the UE can increase the counting of the first counter to properly control the first counter to decrease the failure probability of the SR procedure.

Figure 3:
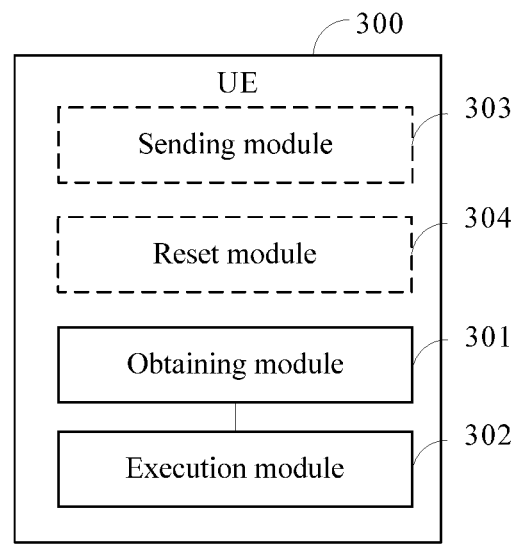
FIG. 3 is a first schematic structural diagram of user equipment according to an embodiment of the present invention.

As shown in FIG. 3, an embodiment of the present invention provides UE 300. The UE 300 includes an obtaining module 301 and an execution module 302.

The obtaining module 301 is configured to obtain first information when the UE 300 triggers an SR.

The execution module 302 is configured to execute any one of the following actions based on the first information obtained by the obtaining module 301: at least one of skipping increasing counting of a first counter and increasing counting of a second counter, and at least one of stopping a timer and prohibiting starting a timer.

The first information is used to indicate that the UE 300 has currently stopped transmitting the SR, the UE 300 is unable to transmit the SR on an SR resource within a duration corresponding to the timer, the first counter is used to record a count of transmitting the SR, and the second counter is used to record a count of stopping transmitting the SR.

Optionally, as shown in FIG. 3, the UE 300 further includes a sending module 303 and a reset module 304.

The sending module 303 is configured to transmit the SR to a network device.

The reset module 304 is configured to reset the second counter.

Optionally, the execution module 302 is further configured to, if the counting of the second counter is greater than or equal to a first threshold, increase the counting of the first counter, or consider the SR procedure fails.

Optionally, the first threshold is predefined or configured for the UE by the network device.

Optionally, the first information is indication information sent by a physical layer of the UE 300 to a MAC layer.

When the UE according to this embodiment of the present invention triggers the SR, the UE executes any one of the following actions based on the first information that is used to indicate that the UE has currently stopped transmitting the SR: at least one of skipping increasing the counting of the first counter and increasing the counting of the second counter, and at least one of stopping the timer and prohibiting starting a timer. In this way, when the UE has currently stopped transmitting the SR, the UE properly controls the counter to decrease the failure probability of the SR procedure. At the same time, the timer is suspended or prohibited from starting up, so that the UE is able to immediately transmit the SR on a subsequent SR resource. As a result, the SR delay is reduced and the failure probability of the SR procedure is decreased.

The UE according to this embodiment of the present invention can implement the process shown in FIG. 2 in the foregoing method embodiment. To avoid repetition, details are not described herein again.

Figure 4:
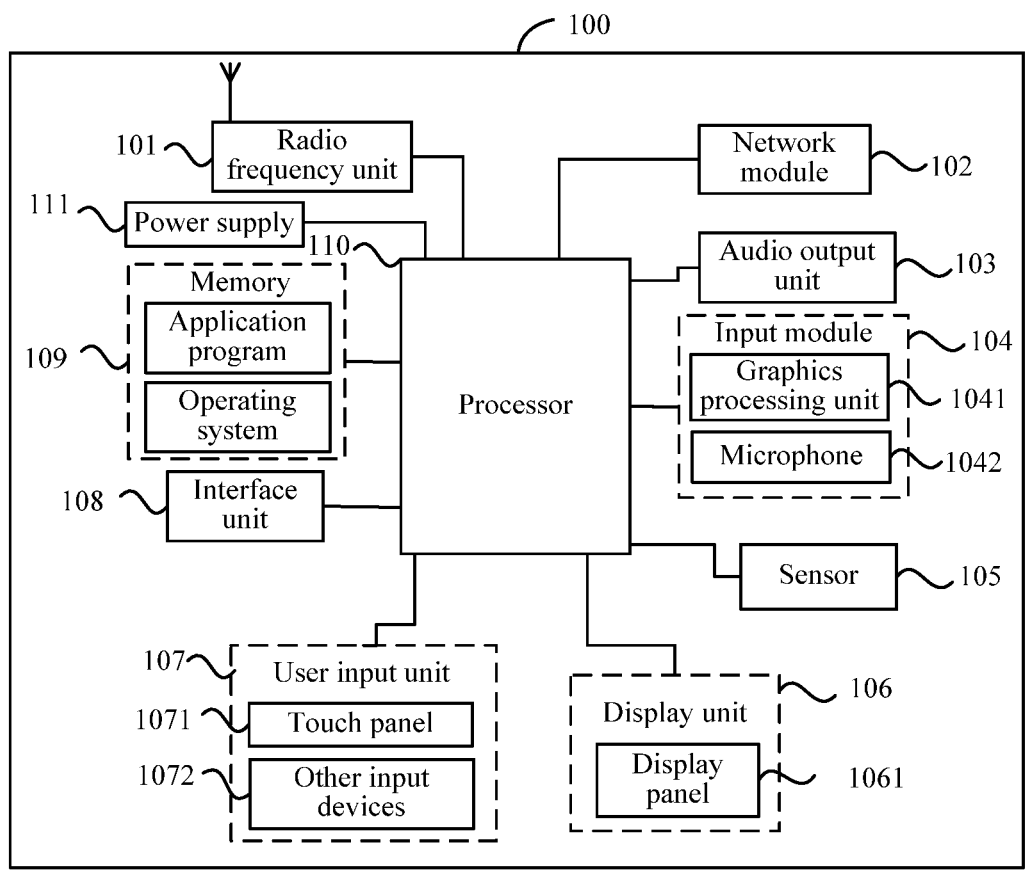
FIG. 4 is a second schematic structural diagram of user equipment according to an embodiment of the present invention.

For example, the UE is a terminal. As shown in FIG. 4, FIG. 4 is a schematic diagram of a hardware structure of a terminal that implements the embodiments of the present invention. The terminal 100 includes but is not limited to components such as a radio frequency unit 101, a network module 102, an audio output unit 103, an input unit 104, a sensor 105, a display unit 106, a user input unit 107, an interface unit 108, a memory 109, a processor 110, and a power supply 111. A person skilled in the art can understand that a structure of the terminal 100 shown in FIG. 4 does not constitute a limitation on the terminal, and the terminal 100 may include more or fewer components than those shown in the figure, or a combination of some of the components, or a different arrangement of the components. In the embodiments of the present invention, the terminal 100 includes but is not limited to a mobile phone, a tablet computer, a laptop computer, a personal digital assistant, an in-vehicle terminal, a wearable device, or a pedometer.

The processor 110 is configured to obtain first information when the terminal 100 triggers an SR, and execute any one of the following actions based on the first information: at least one of skipping increasing counting of a first counter and increasing counting of a second counter, and at least one of stopping a timer and prohibiting starting a timer, where the first information is used to indicate that the terminal 100 has currently stopped transmitting the SR, the terminal 100 is unable to transmit the SR on an SR resource within a duration corresponding to the timer, the first counter is used to record a count of transmitting the SR, and the second counter is used to record a count of stopping transmitting the SR.

When the terminal 100 according to this embodiment of the present invention triggers the SR, the terminal 100 executes any one of the following actions based on the first information that is used to indicate that the terminal has currently stopped transmitting the SR: at least one of skipping increasing the counting of the first counter and increasing the counting of the second counter, and at least one of stopping the timer and prohibiting starting a timer. In this way, when the terminal 100 has currently stopped transmitting the SR, the terminal 100 properly controls the counter to decrease a failure probability of the SR procedure. At the same time, the timer is suspended or prohibited from starting up, so that the terminal 100 is able to immediately transmit the SR on a subsequent SR resource. As a result, an SR delay is reduced and the failure probability of the SR procedure is decreased.

It should be understood that in this embodiment of the present invention, the radio frequency unit 101 may be configured to receive and send signals during an information receiving and sending process or a call process. Specifically, the radio frequency unit 101 receives downlink data from a base station and delivers the downlink data to the processor 110 for processing; and in addition, the radio frequency unit 101 sends uplink data to the base station. Typically, the radio frequency unit 101 includes but is not limited to an antenna, at least one amplifier, a transceiver, a coupler, a low noise amplifier, a duplexer, and the like. In addition, the radio frequency unit 101 may further communicate with a network and other devices through a wireless communication system.

The terminal 100 provides wireless broadband internet access for a user by using the network module 102 and helps the user to, for example, send and receive an email, browse a webpage, or access streaming media.

The audio output unit 103 may convert audio data that is received by the radio frequency unit 101 or the network module 102 or that is stored in the memory 109 into an audio signal and outputs the audio signal as a sound. In addition, the audio output unit 103 may further provide audio output related to a specific function (such as a calling signal receive sound, a message receive sound, or the like) executed by the terminal 100. The audio output unit 103 includes a loudspeaker, a buzzer, a receiver, and the like.

The input unit 104 is configured to receive an audio or video signal. The input unit 104 may include a graphics processing unit (GPU) 1041 and a microphone 1042. The graphics processing unit 1041 processes image data in a static picture or video obtained by an image capturing apparatus (for example, a camera) in a video capturing mode or an image capturing mode. A processed image frame may be displayed on the display unit 106. The image frame obtained after processing by the graphics processing unit 1041 may be stored in the memory 109 (or other storage media) or sent by the radio frequency unit 101 or the network module 102. The microphone 1042 may receive a sound and is capable of processing the sound as audio data. The processed audio data may be converted, in a phone service mode, into a format that can be sent by the radio frequency unit 101 to a mobile communication base station.

The terminal 100 further includes at least one sensor 105, for example, an optical sensor, a motion sensor, and other sensors. Specifically, the optical sensor includes an ambient light sensor and a proximity sensor. The ambient light sensor may adjust luminance of a display panel 1061 based on brightness of ambient light, and the proximity sensor may turn off the display panel 1061 and/or backlight when the terminal 100 moves to an ear. As a type of motion sensor, an accelerometer sensor can detect a value of an acceleration in each direction (usually, there are three axes), can detect a magnitude and a direction of gravity when the terminal is static, and may be configured for terminal posture recognition (for example, screen switching between landscape and portrait, a related game, and magnetometer posture calibration), vibration recognition related functions (for example, pedometer and knocking), and the like. The sensor 105 may further include a fingerprint sensor, a pressure sensor, an iris sensor, a molecular sensor, a gyroscope, a barometer, a hygrometer, a thermometer, an infrared sensor, or the like. Details are not described herein.

The display unit 106 is configured to display information input by the user or information provided for the user. The display unit 106 may include the display panel 1061. The display panel 1061 may be configured in a form of a liquid crystal display (LCD), an organic light-emitting diode (OLED), or the like.

The user input unit 107 may be configured to receive input digit or character information, and generate a key signal input related to user settings and function control of the terminal 100. Specifically, the user input unit 107 may include a touch control panel 1071 and other input devices 1072. The touch panel 1071, also referred to as a touchscreen, may capture a touch operation of a user on or near the touch panel 1071 (for example, an operation performed by the user by using any appropriate object or accessory such as a finger or a stylus on the touch panel 1071 or near the touch panel 1071). The touch panel 1071 may include two parts: a touch detection apparatus and a touch controller. The touch detection apparatus detects a touch orientation of the user, detects a signal brought by the touch operation, and transfers the signal to the touch controller. The touch controller receives touch information from the touch detection apparatus, converts the touch information into point coordinates, and transmits the point coordinates to the processor 110, and receives and executes a command sent by the processor 110. In addition, the touch panel 1071 may be implemented in various types, for example, a resistive, capacitive, infrared, and surface acoustic wave touch panel. The user input unit 107 may include other input devices 1072 in addition to the touch panel 1071. Specifically, the other input devices 1072 may include but are not limited to a physical keyboard, a function key (such as a volume control key or a switch key), a trackball, a mouse, a joystick, or the like. Details are not described herein.

Further, the touch panel 1071 may cover the display panel 1061. After detecting a touch operation on or near the touch panel 1071, the touch panel 1061 transfers the touch operation to the processor 110 for determining a touch event type. Subsequently, the processor 110 provides corresponding visual output on the display panel 1061 based on the touch event type. In FIG. 4, the touch panel 1071 and the display panel 1061 are used as two separate components to implement input and output functions of the terminal 100. However, in some embodiments, the touch panel 1071 may be integrated with the display panel 1061 to implement the input and output functions of the terminal 100. This is not specifically limited herein.

The interface unit 108 is an interface for an external apparatus to connect to the terminal 100. For example, the interface unit 108 may include a wired or wireless head-mounted earphone port, an external power supply (or a battery charger) port, a wired or wireless data port, a memory card port, a port used to connect an apparatus with an identification module, an audio input/output (I/O) port, a video I/O port, an earphone port, and the like. The interface unit 108 may be configured to receive input (for example, data information and power) from the external apparatus and transmits the received input to one or more elements in the terminal 100 or may be configured to transmit data between the terminal 100 and the external apparatus.

The memory 109 may be configured to store software programs and various types of data. The memory 109 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 109 may include a high-speed random access memory, and may further include a non-volatile memory such as at least one disk storage device, a flash memory device, or other volatile solid-state storage devices.

The processor 110 is a control center of the terminal 100 that connects various parts of the entire terminal 100 by using various interfaces or lines. The processor 110 performs various functions of the terminal 100 and processes data by running or executing software programs and/or modules stored in the memory 109 and calling data stored in the memory 109, so as to perform overall monitoring on the terminal 100. The processor 110 may include one or more processing units. Optionally, an application processor and a modem processor may be integrated into the processor 110. The application processor mainly processes an operating system, a user interface, an application program, and the like. The modem processor mainly processes wireless communication. It can be understood that the modem processor may alternatively be not integrated into the processor 110.

The terminal 100 may further include the power supply 111 (for example, a battery) that supplies power to the components. Optionally, the power supply 111 may be logically connected to the processor 110 through a power supply management system. In this way, functions such as charging management, discharging management, and power consumption management are implemented by the power supply management system.

In addition, the terminal 100 includes some functional modules that are not shown. Details are not described herein.

Optionally, an embodiment of the present invention further provides UE, including a processor, a memory, and a computer program stored in the memory and capable of running on the processor. When the computer program is executed by the processor, the procedures in the foregoing embodiment of the resource request method are implemented, with the same technical effect achieved. To avoid repetition, details are not described herein again.

An embodiment of the present invention further provides a computer-readable storage medium. The computer-readable storage medium stores a computer program. When the computer program is executed by a processor, the procedures in the foregoing embodiments of the resource request method are implemented, with the same technical effect achieved. To avoid repetition, details are not described herein again. The computer-readable storage medium may be a read-only memory ROM), a random access memory (RAM), a magnetic disk, or an optical disc.

It should be noted that in this specification, the terms "include", "comprise", or any of their variants are intended to cover a non-exclusive inclusion, so that a process, a method, an article, or an apparatus that includes a list of elements not only includes those elements but also includes other elements which are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the foregoing description of the implementations, a person skilled in the art may clearly understand that the method in the foregoing embodiments may be implemented by using software in combination with a necessary general hardware platform, and certainly may alternatively be implemented by using hardware, while the former is a more preferred implementation in most cases. Based on such an understanding, the technical solutions of the present invention essentially, or the part contributing to the related art may be implemented in a form of a software product. The computer software product is stored in a storage medium (such as a ROM, a RAM, a magnetic disk, or an optical disc), and includes several instructions for instructing a terminal (which may be a mobile phone, a personal computer, a server, an air conditioner, a network device, or the like) to perform the methods described in the embodiments of the present invention.

The embodiments of the present invention are described above with reference to the accompanying drawings, but the present invention is not limited to the foregoing implementations. The foregoing embodiments are only illustrative rather than restrictive. Inspired by the present invention, a person of ordinary skill in the art can still derive many variations without departing from the essence of the present invention and the protection scope of the claims. All these variations shall fall within the protection of the present invention.

What is claimed is:

1. A resource request method, comprising:
    obtaining first information when user equipment UE triggers a scheduling request SR; and
    executing, by the UE based on the first information, any one of the following actions: at least one of skipping increasing counting of a first counter and increasing counting of a second counter, and at least one of stopping a timer and prohibiting starting a timer, wherein the first information is used to indicate that the UE has currently stopped transmitting the SR, the UE is unable to transmit the SR on an SR resource within a duration corresponding to the timer, the first counter is used to record a count of transmitting the SR, and the second counter is used to record a count of stopping transmitting the SR.

2. The method according to claim 1, further comprising: transmitting, by the UE, the SR to a network device; and resetting, by the UE, the second counter.

3. The method according to claim 1, further comprising: if the counting of the second counter is greater than or equal to a first threshold, increasing, by the UE, the counting of the first counter, or considering the SR procedure fails.

4. The method according to claim 3, wherein the first threshold is predefined or configured for the UE by a network device.

5. The method according to claim 1, wherein the first information is indication information sent by a physical layer of the UE to a medium access control MAC layer.

6. User equipment UE, comprising: a memory, a processor, and a computer program stored in the memory and capable of running on the processor, wherein the computer program is executed by the processor to implement:
obtaining first information when the UE triggers a scheduling request SR; and
executing any one of the following actions based on the first information: at least one of skipping increasing counting of a first counter and increasing counting of a second counter, and at least one of stopping a timer and prohibiting starting a timer, wherein
the first information is used to indicate that the UE has currently stopped transmitting the SR, the UE is unable to transmit the SR on an SR resource within a duration corresponding to the timer, the first counter is used to record a count of transmitting the SR, and the second counter is used to record a count of stopping transmitting the SR.

7. The UE according to claim 6, wherein the computer program is further executed by the processor to implement:
transmitting the SR to a network device; and
resetting the second counter.

8. The UE according to claim 6, wherein the computer program is further executed by the processor to implement:
if the counting of the second counter is greater than or equal to a first threshold, increasing the counting of the first counter, or considering the SR procedure fails.

9. The UE according to claim 8, wherein the first threshold is predefined or configured for the UE by a network device.

10. The UE according to claim 6, wherein the first information is indication information sent by a physical layer of the UE to a medium access control MAC layer.

11. A non-transitory computer-readable storage medium, wherein the non-transitory computer-readable storage medium stores a computer program, and the computer program is executed by a processor to implement: obtaining first information when the UE triggers a scheduling request SR; and executing any one of the following actions based on the first information: at least one of skipping increasing counting of a first counter and increasing counting of a second counter, and at least one of stopping a timer and prohibiting starting a timer, wherein the first information is used to indicate that the UE has currently stopped transmitting the SR, the UE is unable to transmit the SR on an SR resource within a duration corresponding to the timer, the first counter is used to record a count of transmitting the SR, and the second counter is used to record a count of stopping transmitting the SR.

12. The non-transitory computer-readable storage medium according to claim 11, wherein the computer program is further executed by the processor to implement: transmitting the SR to a network device; and resetting the second counter.

13. The non-transitory computer-readable storage medium according to claim 11, wherein the computer program is further executed by the processor to implement: if the counting of the second counter is greater than or equal to a first threshold, increasing the counting of the first counter, or considering the SR procedure fails.

14. The non-transitory computer-readable storage medium according to claim 13, wherein the first threshold is predefined or configured for the UE by a network device.

15. The non-transitory computer-readable storage medium according to claim 11, wherein the first information is indication information sent by a physical layer of the UE to a medium access control MAC layer.

* * * * *